United States Patent [19]
Seureau et al.

[11] Patent Number: 5,616,244
[45] Date of Patent: Apr. 1, 1997

[54] CYCLONE SEPARATOR HAVING AN INCORPORATED COALESCER

[75] Inventors: Jacques Seureau, Aulon, France; Mark Hoyack, Fremont, Calif.

[73] Assignee: Elf Aquitaine Production, France

[21] Appl. No.: 617,444

[22] Filed: Mar. 18, 1996

[30] Foreign Application Priority Data

Mar. 31, 1995 [FR] France .................................. 95 03825

[51] Int. Cl.⁶ .................................................. B01D 21/26
[52] U.S. Cl. .................... 210/295; 210/512.1; 210/512.2
[58] Field of Search ..................... 210/294, 295, 210/304, 323.1, 508, 512.1, 512.2, DIG. 5, 649

[56] References Cited

U.S. PATENT DOCUMENTS

| | | |
|---|---|---|
| 3,794,583 | 2/1974 | Rhodes . |
| 4,116,790 | 9/1978 | Prestridge . |
| 4,640,781 | 2/1987 | Hughes . |
| 5,093,006 | 3/1992 | Kalnins .......................... 210/512.1 |
| 5,332,500 | 7/1994 | Seureau et al. . |
| 5,478,484 | 12/1995 | Michaluk ......................... 210/788 |

*Primary Examiner*—David A. Reifsnyder
*Attorney, Agent, or Firm*—Bacon & Thomas

[57] ABSTRACT

Cyclone separator comprising a body (10) formed by a cylindrical part (12) and a converging, substantially conical part (14), at least one inlet (22) mounted tangentially on the cylindrical part (12) and a substantially tubular element (26;62;78) mounted on the body and in hydraulic communication therewith in that the separator includes a coalescer (40;64;70) arranged around the tubular element and adapted to receive liquid to be separated prior to its entry into the cyclone.

7 Claims, 2 Drawing Sheets

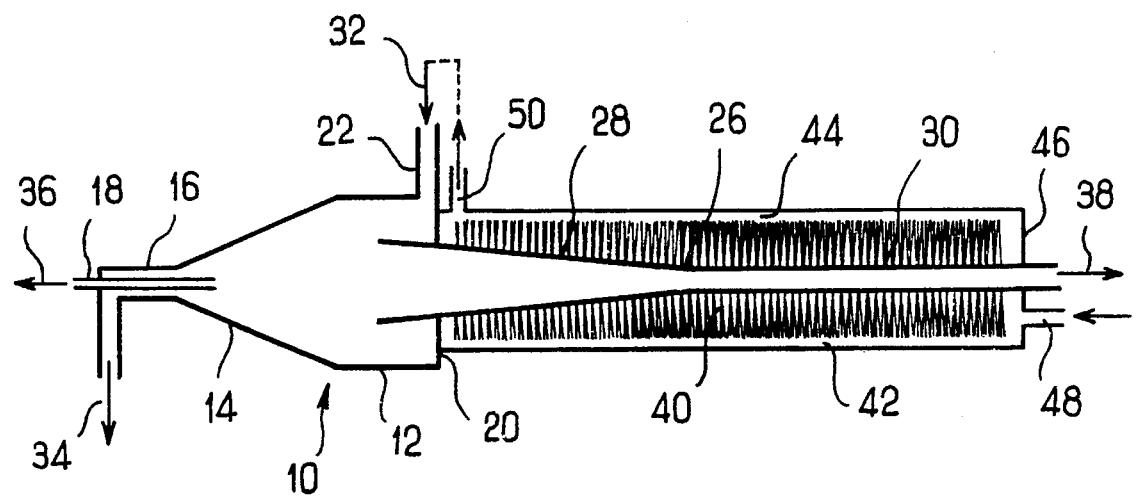
FIG_1
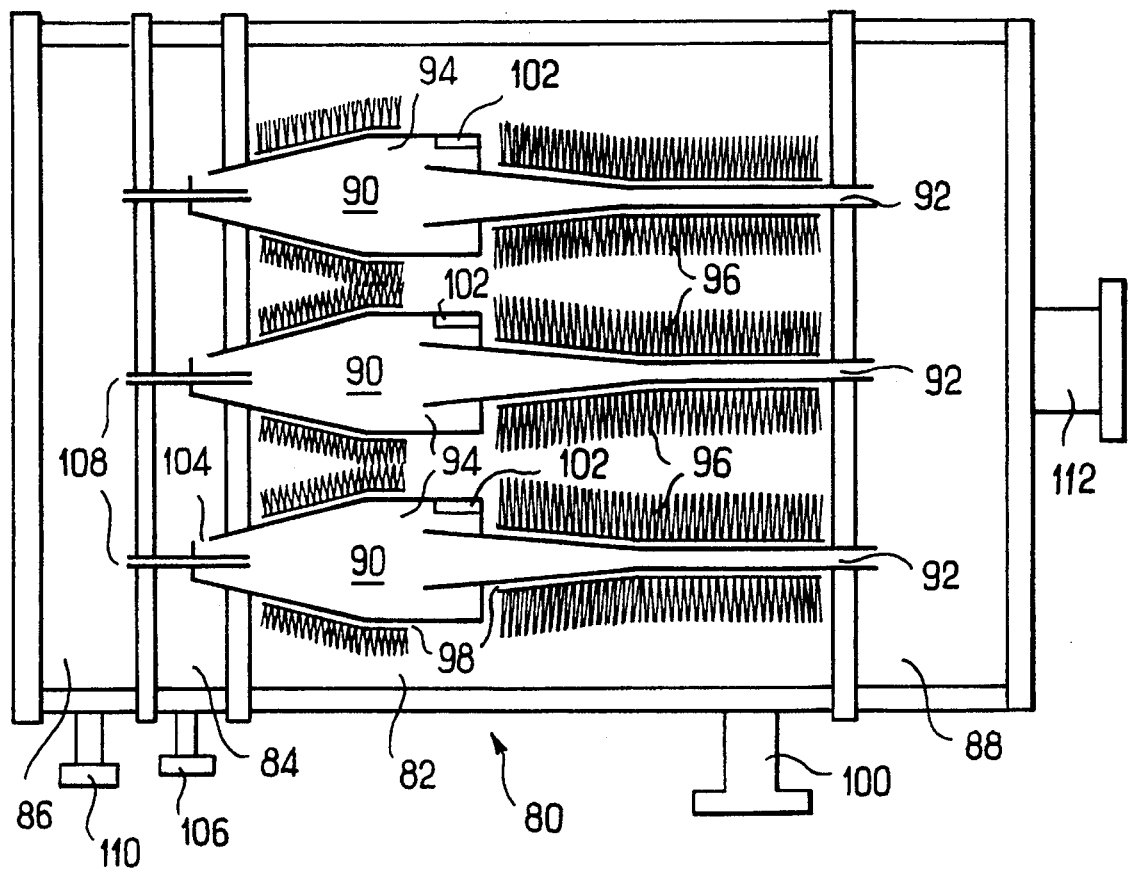
FIG_4

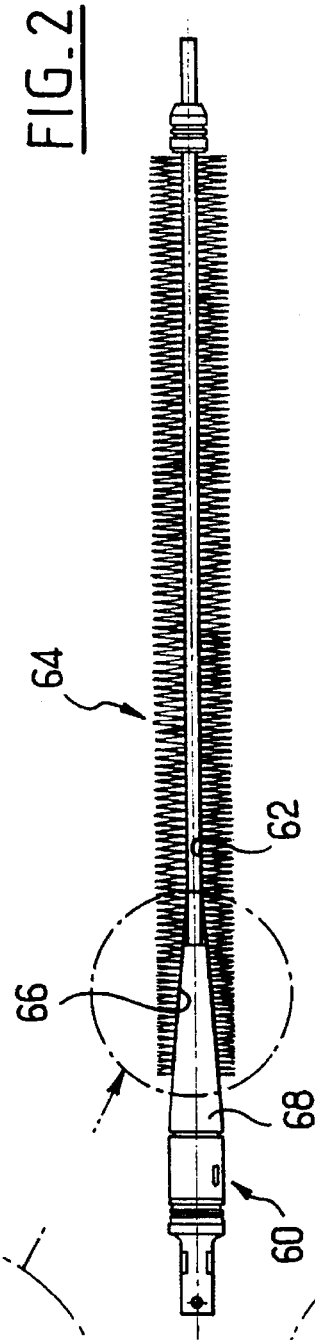
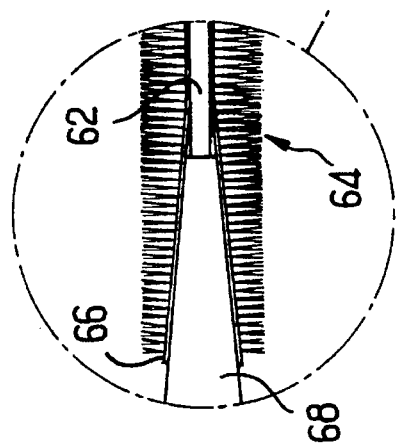
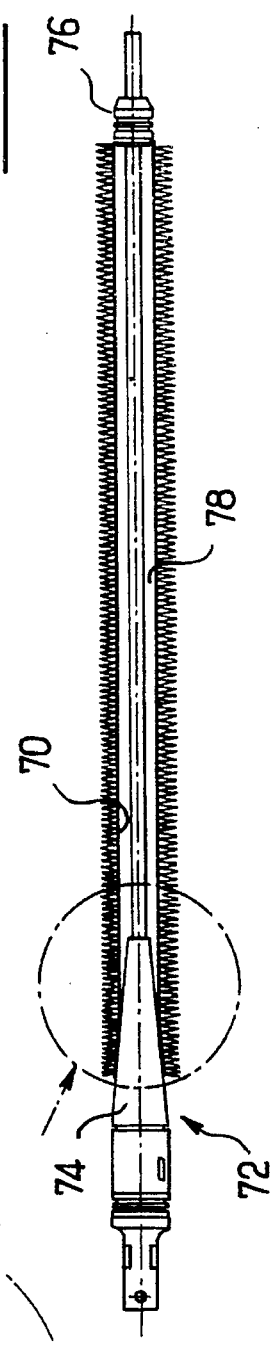
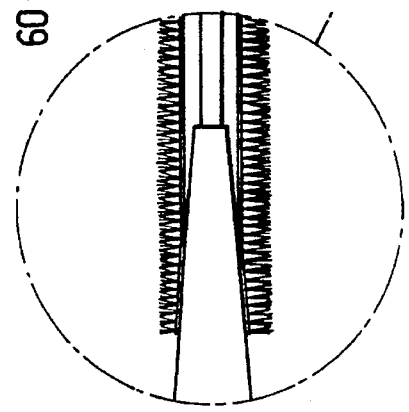

CYCLONE SEPARATOR HAVING AN INCORPORATED COALESCER

BACKGROUND OF THE INVENTION

1. Field of the Invention

The present invention relates to a cyclone separator having an incorporated coalescer and, more particularly, to such a separator having a coalescer which is adapted to form an upstream pretreatment stage therefor.

2. Description of Related Art

Cyclone separators, more commonly called hydrocyclones, are generally intended for separating two immiscible phases of different densities. In this type of separator, the mixture of the two phases to be separated is injected at high speed into a chamber which is generally cylindrical so that the mixture progresses through the chamber with a gyratory movement. The centrifugal forces generated by this gyratory movement acting on the mixture of two phases of different densities causes the migration of the denser phase towards the wall of the chamber, the lighter phase remaining towards the interior of the chamber. By arranging two axial outlets for the phases, one towards the wall of the chamber and the other along the axis of the chamber, and by using a back-pressure arrangement, the two phases may be separated. This operating principle is paricularly adapted to separate an oil/water emulsion into its two components. The axial outlet of this type of separator generally comprises a tubular part of low conicity which is connected to the cylindrical chamber by a conical part. A two-phase cyclone separator of this type is described in U.S. Pat. No. 4,749,490.

Also known are three-phase cyclone separators which are adapted to separate a solid phase, for example, sand, which is in suspension in an emulsion formed of, for example, oil and water. Such a three-phase separator is described in U.S. Pat. No. 5,332,500. In common with two-phase separators, three-phase cyclones have an outlet for one of the liquid phases which comprises an extended tubular part of low conicity.

One principal application for cyclone separators is the treatment of waste water from oil and/or gas production wells. Typically, cyclone separators are used on offshore oil production platforms to treat the oil/water/sand mixture which is separated from the production fluids in order to clean the water before its disposal or re-injection. Available space on a production platform is very limited. Several cyclone separators are generally installed side by side in a treatment unit located on the platform. However, the form of the previously described conical parts, and that of the tubular parts of low conicity, mean that there is a considerable amount of wasted space in the treatment unit between the various separators. Furthermore, it is desirable, in order to increase the efficiency of the separator, to provide a pretreatment stage, upstream of the separator, for the mixture to be treated. In the case of an oil-water emulsion, this pretreatment stage advantageously comprises a coalescer intended to transform the microscopic drops of oil in the emulsion into larger drops which are more easily separated in the cyclone. However, in the case where the treatment unit is to be installed on a production platform, such coalescers cannot be used due to the lack of available space.

SUMMARY OF THE INVENTION

The object of the present invention is therefor to provide a cyclone separator having an upstream coalescer for pretreating the emulsion to be separated, but which is more compact than previously proposed devices and thus minimises any wasted space.

According to the invention there is provided a cyclone separator comprising a body formed by a cylindrical part and a converging, substantially conical part, at least one inlet mounted tangentially on the cylindrical part and a substantially tubular element mounted on the body and in hydraulic communication therewith characterised in that the separator further comprises a coalescer arranged around the tubular element and adapted to receive liquid to be separated prior to its entry into the cyclone.

The present invention will now be described by way of example only, with reference to the accompanying drawings

BRIEF DESCRIPTION OF FIGURES DRAWING

FIG. 1 is a schematic cross-sectional view of a cyclone separator having an incorporated coalescer, according to a first embodiment of the invention;

FIGS. 2 and 3 are schematic cross-sectional views of separators according to second and third embodiments of the invention;

FIGS. 2a and 3a are detailed views of parts of the separators of FIGS. 2 and 3 respectively; and FIG. 4 is a schematic cross-sectional view of a separator assembly according toga further embodiment of the invention.

DETAILED DESCRIPTION OF THE PREFERRED EMBODIMENT

FIG. 1 is a cross sectional view of a three phase cyclone separator which comprises a body 10 formed of a cylindrical part 12 and a conical part 14. The conical part 14 is formed, at the apex of the cone, with a cylindrical endpiece 16 inside which is arranged a tubular outlet 18, both of which are located coaxially with the cylindrical part 12.

The body 10 is closed by an annular element 20 which comprises one or more inlets 22 for the emulsion to be treated in the cyclone. The inlet is arranged tangentially with respect to the cylindrical part 12. In the opening of the annular element there is sealingly mounted a generally tubular element 26 which comprises a part of low conicity 28 and a cylindrical extension 30.

An oil/water emulsion containing solid matter in suspension enters the body under pressure through the inlet 22 in the direction of arrow 32 and so adopts a path tangential to the body 10. The emulsion flows at high speed in a gyratory movement inside the cylindrical part 12. Under the effect of the centrifugal force thus generated, the solid matter in suspension migrates towards the walls of the cylindrical part 12 and of the conical part 14 and is evacuated through the endpiece 16, in the direction of arrow 34.

The conical shape of the part 14 forces the oil/water emulsion, from which the solid matter has been removed, to change its longitudinal direction of flow and to pass into the tubular element 26 while continuing to flow in its gyratory movement. The two phases of the emulsion separate during its passage along the part of low conicity 28, the water being found towards the wall of the parts 28 and 30, while the oil moves towards the axis thereof. A back pressure caused by a restriction formed at the end of the tubular extension 30 (not shown) applies to the flow of oil and causes it to reverse direction. A stream of oil is thus caused to flow in a direction opposite to that of the water, and the oil leaves the separator through outlet 18 in the direction of arrow 36, the purified water leaving the tubular extension 30 in the direction of arrow 38.

According to the invention, a coalescer 40 is arranged around the tubular element 20, along substantially the whole length thereof. In the example shown, the coalescer is of the brush type and is formed of a large number of bristles, made of an oleophilic material, which project generally radially from the outer wall of the tubular element 20. Preferably, the oleophilic material used is a plastics material such as polyamide or polypropylene. A cylindrical sleeve 42 is located around the coalescer and defines with the annular element 20 a coalescing chamber 44. The cylindrical extension 30 projects through an end wall 46 of the cylindrical sleeve 42. The cylindrical sleeve 42 comprises an inlet 48 and an outlet 50 which communicates directly with the inlet 22 of the cyclone separator. The cylindrical sleeve may be formed by the walls of the vessel containing the cyclone separator.

In use, the emulsion to be treated is injected into the inlet 48 of the coalescing chamber 44 where it progresses along the length of the tubular element 26, contacting the oleophilic brushes of the coalescer 40, before exiting the chamber by way of outlet 50. During its passage through the coalescing chamber 44 the contact between the emulsion and the oleophilic brushes causes the microscopic droplets of oil in the emulsion to coalesce and form droplets whose mean diameter has been significantly increased. These droplets remain in suspension in the emulsion when it leaves the coalescing chamber 44 by way of outlet 50.

The pretreated emulsion, containing the enlarged droplets of oil, is then injected into the cyclone separator through inlet 22 where it follows the path described hereabove. However, as the oil droplets mean diameter is significantly larger than in an untreated emulsion, the efficiency of the cyclone is considerably increased, the percentage of oil removed from the emulsion being increased by approximately 5 to 20% depending on the characteristics of the incoming emulsion.

In FIG. 2 there is shown a second embodiment of a cyclone separator in which, in the interests of ease of manufacture and maintenance, the coalecer is formed as a separate sub-assembly which can be mounted on an existing cyclone. In the embodiment shown, a cyclone separator 60, which in the illustrated example is a two-phase cyclone has arranged around the tubular element 62 a coalescer assembly 64 comprising a generally tubular sleeve 66 whose internal dimensions correspond closely to the outer dimensions of the tubular element 62 and the conical part 68. The tubular sleeve 66 is more clearly seen in FIG. 2a. The operation of the cyclone and the upstream pre-treatment stage formed by the coalescer is similar to that of the embodiment of FIG. 1.

In FIGS. 3 and 3a there is shown a further embodiment of cyclone which differs from that of FIGS. 2 and 2a in that the tubular sleeve on which is mounted the brush coalescer has a constant cylindrical cross-section. As shown in the figures, a tubular sleeve 70, of constant cross-section, is mounted on the cyclone separator 72 between the conical part 74 and a nozzle 76 at the end of the tubular element 78. The operation of the cyclone and the upstream pre-treatment coalescer is similar to that of the embodiments of FIGS. 1 and 2, the tubular element and the coalescer being enclosed in a tubular sleeve (not shown), as in the case of the device of FIG. 1.

FIG. 4 shows a further embodiment of the present invention which differs from those previously described in that several cyclone separators, with their associated coalescers, are arranged in a common chamber containing the emulsion to be treated.

As shown in FIG. 4, a separator assembly, shown generally 80, is divided into chambers 82,84,86,88, each separated from the adjoining chamber by a partition wall. The principal, or feed chamber 82 contains several cyclone separators, three in the illustrated example, arranged side by side. On the outer surface of the tubular part 92 of each separator 90, and on the outer surface of the body 94 of each separator, are mounted brush coalescers 96 The coalescers 96 may be either dirctly mounted on the cyclone separators, or may be mounted on tubular sleeves as shown.

The feed chamber 82 comprises an inlet 100 for the emulsion to be treated. Emulsion enters the chamber 82, passes over and through the brush coalescers, and enters inlets 102 of the cyclone sparators 90. After treatment in the separators 90, sand passes from outlets 104 into sand chamber 84 which it leaves by way of outlet 106; oil leaves the separators 90 by way of outlets 108 which open into oil chamber 86 which it leaves by way of outlet 110; and clean water leaves the tubular parts 92 and passes into clean water chamber which it leaves through outlet 112.

During its passage through the feed chamber 82, the emulsion, which is moving relatively slowly, comes into contact with a large number of the bristles of the brush coalescers 96 causing the droplets of oil contained in the emulsion to coalesce and form larger droplets whose mean diameter is significantly greater.

Each of the embodiments of the present invention described above, by ensuring that the oil in the emulsion to treated is at least partially separated from the emulsion, and comprises droplets having a larger mean diameter, prior to its entry into the cyclone, considerably improves the efficiency of the cyclone separator while not increasing the overall volume of the separator unit.

We claim:

1. Cyclone separator comprising a body formed by a cylindrical part and a converging, substantially conical part, at least one inlet mounted tangentially on the cylindrical part, a substantially tubular element mounted on the body and in hydraulic communication therewith and a coalescer arranged around the tubular element and adapted to receive liquid to be separated prior to its entry into the cyclone.

2. Cyclone separator as claimed in claim 1 wherein the coalescer is of the brush type.

3. Cyclone separator as claimed in claim 2 wherein the coalescer comprises a plurality of bristles formed of oleophilic metal.

4. Cyclone separator as claimed in claim 1 wherein the coalescer is mounted directly on the tubular element.

5. Cyclone separator as claimed in claim 1 wherein the coalescer comprises a tubular sleeve mounted upon the tubular element.

6. Cyclone separator as claimed in claim 1 wherein it further comprises a coalescer arranged around the body thereof.

7. Separator assembly comprising a plurality of cyclone separators, each cyclone separator comprising a body formed by a cylindrical part and a converging substantially conical part, at least one inlet mounted on the cylindrical part, a tubular element mounted on the body and in hydraulic communication therewith and a coalescer arranged around the tubular element and adapted to receive liquid to be separated prior to its entry in the cyclone, the separators being arranged in a common chamber adapted to receive an emulsion to be treated, which is in hydraulic communication with the inlets of the separators.

\* \* \* \* \*